United States Patent
Mori

(10) Patent No.: US 9,554,105 B2
(45) Date of Patent: Jan. 24, 2017

(54) PROJECTION TYPE IMAGE DISPLAY APPARATUS AND CONTROL METHOD THEREFOR

(71) Applicant: CANON KABUSHIKI KAISHA, Tokyo (JP)

(72) Inventor: Makiko Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/857,513

(22) Filed: Sep. 17, 2015

(65) Prior Publication Data

US 2016/0094821 A1 Mar. 31, 2016

(30) Foreign Application Priority Data

Sep. 25, 2014 (JP) ................. 2014-195366

(51) Int. Cl.
| | |
|---|---|
| *H04N 3/22* | (2006.01) |
| *H04N 9/31* | (2006.01) |
| *G06T 11/60* | (2006.01) |
| *G06T 3/20* | (2006.01) |
| *G06T 7/00* | (2006.01) |
| *G06T 7/20* | (2006.01) |
| *G06T 3/40* | (2006.01) |

(52) U.S. Cl.
CPC ........... *H04N 9/3185* (2013.01); *G06T 3/20* (2013.01); *G06T 3/4038* (2013.01); *G06T 7/004* (2013.01); *G06T 7/20* (2013.01); *G06T 11/60* (2013.01); *H04N 9/3147* (2013.01)

(58) Field of Classification Search
CPC ...... H04N 9/31; H04N 9/3185; H04N 9/3147; H04N 9/3179; H04N 9/3138; G06T 7/20; G06T 7/00; G06T 7/004; G06T 11/60; G06T 3/20

USPC .............. 348/745, 744, 807, 813, 383
See application file for complete search history.

(56) References Cited

U.S. PATENT DOCUMENTS

| | | | | |
|---|---|---|---|---|
| 6,222,593 B1 * | 4/2001 | Higurashi | .............. | G03B 37/04 315/368.12 |
| 6,456,339 B1 * | 9/2002 | Surati | ................... | G03B 37/04 348/744 |

(Continued)

FOREIGN PATENT DOCUMENTS

JP 2002-77778 A 3/2002

*Primary Examiner* — Trang U Tran
(74) *Attorney, Agent, or Firm* — Canon USA, Inc. I.P. Division

(57) ABSTRACT

An image display apparatus betters adjustment precision in the multi-projection in which two projection images are combined so that the images partially overlap each other. A display apparatus configuring an image projection system configured to project an image by combining on a screen a plurality of projection images so that the images partially overlap each other, includes a transformation unit configured to perform a geometrical transformation on a projection image, and a setting unit configured to set a parameter of the transformation by the transformation unit based on a relation between a position of an overlap region in a projection image obtained before the transformation by the transformation unit is performed, and a position of the overlap region in the projection image obtained after the transformation is performed, wherein an amount or value of the transformation is changed according to the position of a vertex of the overlap region.

12 Claims, 18 Drawing Sheets

(56) References Cited

U.S. PATENT DOCUMENTS

| | | | | |
|---|---|---|---|---|
| 6,545,685 B1 * | 4/2003 | Dorbie | ................ | G06F 3/1438 345/582 |
| 7,339,625 B2 * | 3/2008 | Matthys | ................ | G03B 21/13 348/383 |
| 2016/0112689 A1 * | 4/2016 | Okamoto | ............ | H04N 9/3147 348/745 |

* cited by examiner

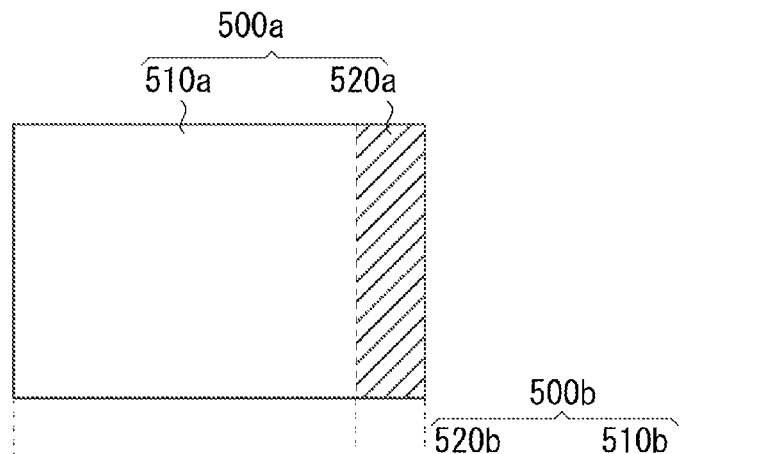
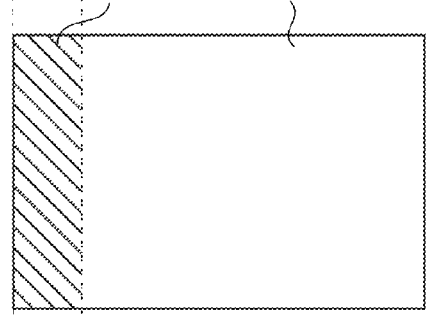
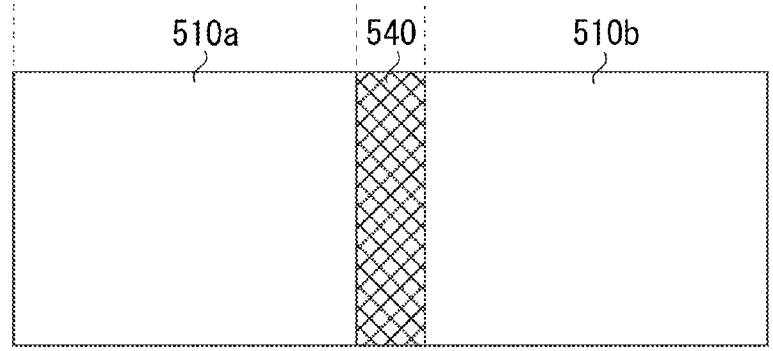

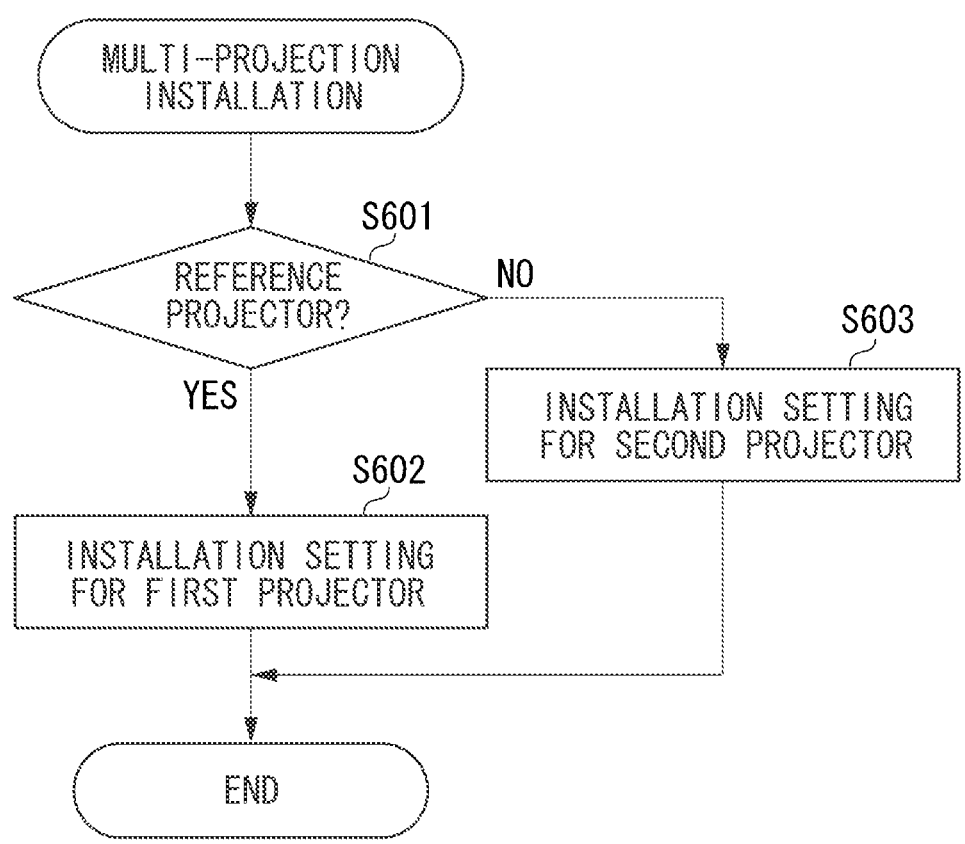

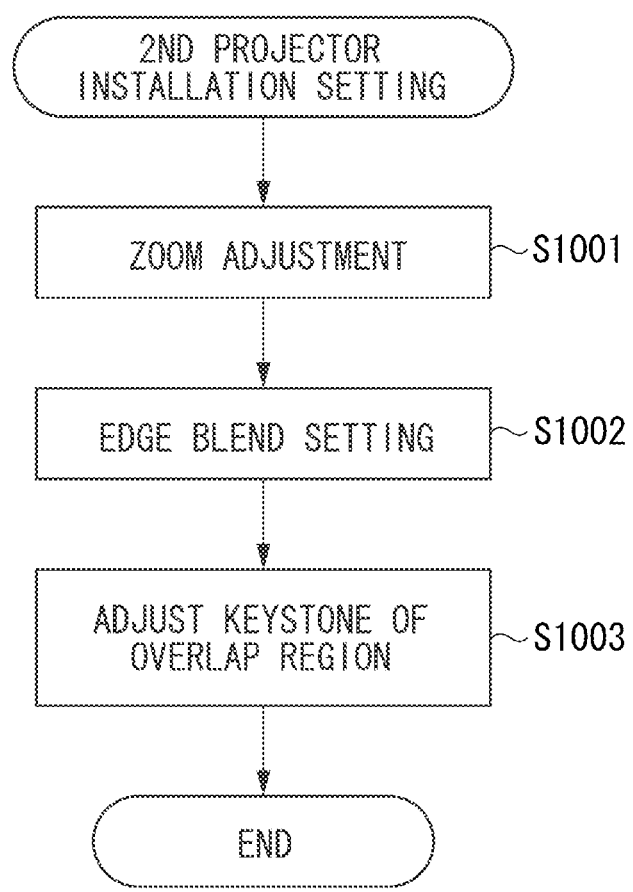

PROJECTION TYPE IMAGE DISPLAY APPARATUS AND CONTROL METHOD THEREFOR

BACKGROUND OF THE INVENTION

Field of the Invention

The present disclosure relates to a projection type image display apparatus that performs multi-projection by using a plurality of projection apparatuses and to a display adjustment and/or control method for the projection type image display apparatus.

Description of the Related Art

There have been known a multi-projection system for displaying images while combining a plurality of projection images projected on a screen individually by different projection apparatuses. An example of such a system is discussed in Japanese Patent Application Laid-Open No. 2002-77778. In this example, an overlap region of a right-side projection image (a portion of the image) projected by a first projection apparatus and an overlap region of a left-side projection image (a portion of the image) projected by a second projection apparatus are superposed to combine the two projection images.

Japanese Patent Application Laid-Open No. 2002-77778 also discussed a technique that a right-side marker is displayed on the right-side projection image and a left-side marker is displayed on the left-side projection image, and that the two markers are superposed on each other so as to adjust the positional misalignment between the overlap region of the right projection image and the overlap region of the left projection image. However, this technique does not consider the method of adjusting the positional misalignment of the overlap regions while taking into the trapezoidal distortion caused by a tilt of each projection apparatus relative to the screen into consideration.

Thus, adjustment for superimposing overlap regions while taking into the trapezoidal distortion into consideration cannot be simply carried out.

SUMMARY OF THE INVENTION

The present disclosure is directed to a projection type image display apparatus that performs multi-projection by using a plurality of projection apparatuses and a display adjustment and/or control method capable for the projection type image display apparatus.

According to an aspect of the present disclosure, a display apparatus that operates to configure an image projection system configured to project an image by combining on a screen a plurality of projection images projected by a plurality of display apparatuses so that the images partially overlap each other, includes a transformation unit configured to perform a geometrical transformation on a projection image, and a setting unit configured to set a parameter of the geometrical transformation by the transformation unit based on a relation between a position of an overlap region in a projection image obtained before the geometrical transformation by the transformation unit is performed, and a position of the overlap region in the projection image obtained after the geometrical transformation is performed, wherein an amount or value of the geometrical transformation is changed according to a position of a vertex of the overlap region.

According to other aspects of the present disclosure, one or more additional projection type image display apparatuses and one or more display adjustment and/or control methods for use therewith are discussed herein. Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIGS. 5A to 5D are diagrams illustrating an example of dimming processing according to the first and second exemplary embodiments.

FIG. 6 is a flowchart illustrating an example of a setting process according to the first and second exemplary embodiments.

FIG. 10 is a flowchart illustrating an example of setting for the second projector according to the first and second exemplary embodiments.

DESCRIPTION OF THE EMBODIMENTS

Various exemplary embodiments, features, and aspects of the disclosure will be described in detail below with reference to the drawings.

Figure 1:
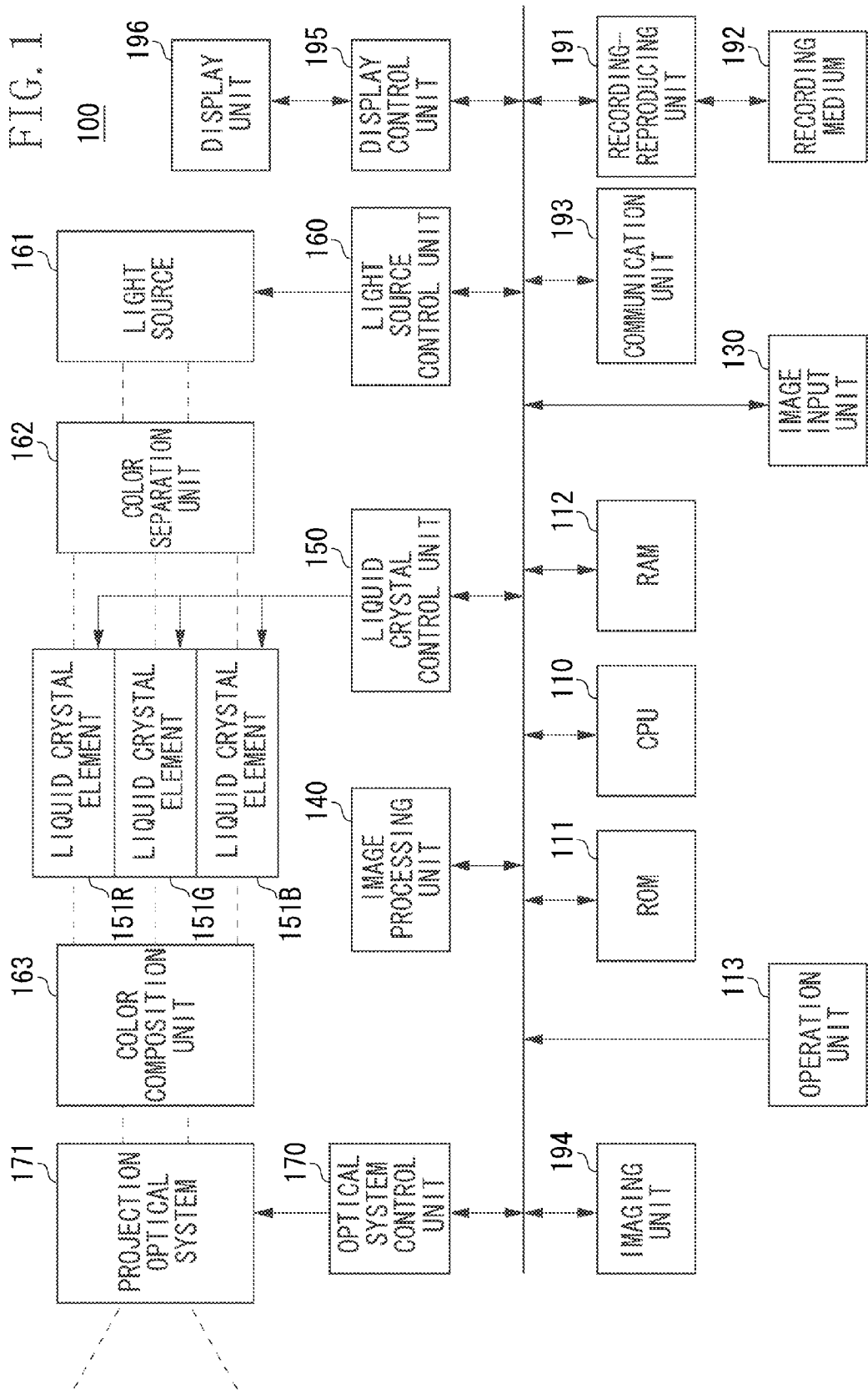
FIG. 1 is a block diagram illustrating an example of a configuration of a projector according to first and second exemplary embodiments.

FIG. 1 is a block diagram illustrating an example of a configuration of an image display apparatus that projects an image on a screen. The image display apparatus controls the light transmittance of each liquid crystal element according to an image that is to be displayed and projects light transmitted through the liquid crystal elements to display the image on the screen. Taking a projector 100 as an example of an image display apparatus, the following description will be given.

The projector 100 includes a central processing unit (CPU) 110, a read only memory (ROM) 111, a random access memory (RAM) 112, an operation unit 113, an image input unit 130, and an image processing unit 140. Furthermore, the projector 100 includes a liquid crystal control unit 150, liquid crystal elements 151R, 151G, and 151B, a light source control unit 160, a light source 161, a color separation unit 162, a color composition unit 163, an optical system control unit 170, and a projection optical system 171. Furthermore, the projector 100 includes a recording-reproducing unit 191, a recording medium 192, a communication unit 193, an imaging unit 194, a display control unit 195, and a display unit 196 in this example. However, the projector 100 is not limited to this arrangement.

The CPU 110 controls each unit of the projector 100. The ROM 111 stores control programs to be executed by the CPU 110. The RAM 112 serves as a work memory of the CPU 110 to temporarily store control programs and data.

The operation unit 113 accepts an instruction from a user, and sends an instruction signal according to the operation content to the CPU 110. The operation unit 113 includes, for example, a switch, a dial, and a touch panel provided on the display unit 196. The operation unit 113 further includes a signal reception unit (an infrared reception unit or the like) that receives a wireless signal from a remote controller and sends a predetermined instruction signal to the CPU 110 based on the received signal. The CPU 110, according to control signals input from the operation unit 113 or the communication unit 193, controls the various units of the projector 100.

The image input unit 130 is a device to which image signals are input from an external apparatus. The image input unit 130 may be a unit that receives image signals from an external apparatus via a communication cable, or may also be a unit that receives image signals from an external apparatus with wireless communication.

The image processing unit 140 performs changing processing of the number of frames, the number of pixels, the shape of images, and the like on the image signal input from the image input unit 130, and supplies the changed image signal to the liquid crystal control unit 150. The image processing unit 140 performs processing such as frame thinning processing, frame interpolation processing, resolution conversion processing, distortion correction processing (keystone correction processing), etc.

The liquid crystal control unit 150 controls the transmittance of each pixel of liquid crystal elements (liquid crystal display panels) 151R, 151G and 151B according to the image signal of a frame supplied from the image processing unit 140. The liquid crystal control unit 150 drives the liquid crystal element (liquid crystal display panel) 151R according to an R (red) signal of the image signal processed by the image processing unit 140, the liquid crystal element 151G according to a G (green) signal of the image signal, and the liquid crystal element 151B according to a B (blue) signal. As a result, the liquid crystal element 151R displays a red image of an RGB image that is to be displayed, the liquid crystal element 151G displays a green image of the RGB image to be displayed, and the liquid crystal element 151B displays a blue image of the RGB image to be displayed. The light source control unit 160 controls the light source 161 to turn on and off, and controls an amount of light when the light source 161 is on. The light source 161 generates illumination light for the liquid crystal elements 151R, 151G, and 151B. The light source 161 includes, for example, a halogen lamp, a xenon lamp, and a high-pressure mercury lamp. Output light of the light source 161 is supplied to the color separation unit 162. The output light of the light source 161 is divided into light beams for red, green, and blue by the color separation unit 162, and the divided light beams enter the liquid crystal elements 151R, 151G, and 151B, respectively. The color separation unit 162 is an element that separates the output light from the light source 161 into red (R), green (G), and blue (B) lights, and includes, for example, a dichroic mirror, a prism. Incidentally, when light emitting diodes (LEDs) or the like that output light beams that correspond to the colors are used as the light source 161, the color separation unit 162 is not necessary.

The liquid crystal elements 151R, 151G, and 151B each are a light modulation device that performs spatial intensity modulation of the illumination light separated by the color separation unit 162 and generates an optical image of a corresponding one of the colors. The liquid crystal control unit 150 controls the transmittance of each pixel of the liquid crystal element 151R according to the red component of the display target image and supplies red light of a certain intensity to the liquid crystal element 151R. Thus an electrical signal is converted into an optical image of red component (red image). Similarly, the liquid crystal control unit 150 controls the transmittance of each pixel of the liquid crystal element 151G according to the green component of the display target image and supplies green light of a certain intensity to the liquid crystal element 151G. Thus an electrical signal is converted into an optical image of green component (green image). The liquid crystal control unit 150 controls the transmittance of each pixel of the liquid crystal element 151B according to the green component of the display target image and supplies blue light of a certain intensity to the liquid crystal element 151B. Thus an electrical signal is converted into an optical image of blue component (blue image).

The color composition unit 163 combines the light beams transmitted through the liquid crystal elements 151R, 151G and 151B so as not to cause any pixel misalignment. As a result, an optical image representing the intended colors of the display target image is produced. The color composition unit 163 is a unit that spatially combines the red (R), green (G), and blue (B) optical images transmitted through the liquid crystal elements 151R, 151G and 151B, and includes, for example, a dichroic mirror, a prism. The optical image combined by the color composition unit 163 is a full-color image that is projected on a screen (not illustrated) through the projection optical system 171.

The projection optical system 171 includes a plurality of lenses and lens-driving actuators, and performs enlargement, size-reduction, and focus adjustment of a projection image projected on the screen, by driving the lenses via the actuators. The optical system control unit 170 controls the projection optical system 171.

The projector 100, if it is of a single-panel type, displays the RGB image via one liquid crystal element, and illuminates the liquid crystal element with light from a high-luminance-value light source. Therefore, in that case, the projector 100 may need to include neither a color separation unit 162 nor a color composition unit 163.

The recording-reproducing unit 191 reproduces still image data or moving image data from the recording medium 192, and receives via the CPU 110 still image data or moving image data about images or video images obtained via the imaging unit 194, and records the still image data or moving image data on the recording medium 192. The recording-reproducing unit 191 also records on the recording medium 192 still image data or moving image data received via the communication unit 193. The recording-reproducing unit 191 includes, for example, an interface that electrically connects to the recording medium 192 and a microprocessor for communicating with the recording medium 192. Part of the functions of the recording-reproducing unit 191 may be substituted by the CPU 110 executing a program stored in the ROM 111.

The recording medium 192 records still image data, moving image data, and other data. As the recording medium 192, recording media of any formats, such as a magnetic disk, an optical disk, and a semiconductor memory, can be used. The recording medium 192 may be detachably attached to the projector 100 or a built-in recording medium.

The communication unit 193 communicates with an external apparatus, and receives control signals, still image data, moving image data, etc., therefrom. The communication unit 193 can use a wireless local area network (LAN), a wired LAN, a universal serial bus (USB), Bluetooth (registered trademark), etc., and the communication format is not limited to any particular format. If a terminal of the image input unit 130 is, for example, a High-Definition Multimedia Interface (HDMI) (registered trademark) terminal, the communication unit 193 may be a unit that performs the Consumer Electronic Control (CEC) communication therethrough. The external apparatus is, for example, a personal computer, a camera, a cellular phone, a smart phone, a hard disk recorder, a game machine, a remote controller.

The imaging unit 194 captures an image projected on a screen (not illustrated) by the projection optical system 171. The imaging unit 194 sends the captured image data to the CPU 110. The CPU 110 temporarily stores the image data from the imaging unit 194 into the RAM 112 and, based on a program stored in the ROM 111, converts the temporarily stored image data into still image data or moving image data. The imaging unit 194 includes an imaging element that converts an optical image into an image signal, lenses that cause an optical image of a subject to be incident on the imaging element, actuators that drive the lenses, a microprocessor that controls the actuator, an analog-to-digital (AD) conversion unit that converts an output image signal of the imaging element into a digital signal, etc. Incidentally, the imaging unit 194 may be an imaging unit that captures an image, for example, on a viewer side in the direction opposite to the direction to the screen (not illustrated).

The display control unit 195 causes the display unit 196 to display an operation screen or images of switch icons and the like for operating the projector 100. The display unit 196 may be, for example, a liquid crystal display, a cathode ray tube (CRT) display, an organic electroluminescence (EL) display, or an LED display. Furthermore, the display unit 196 may cause LEDs or the like that correspond to specific buttons to emit light in order to indicate the specific buttons recognizably to the user.

Figure 2:
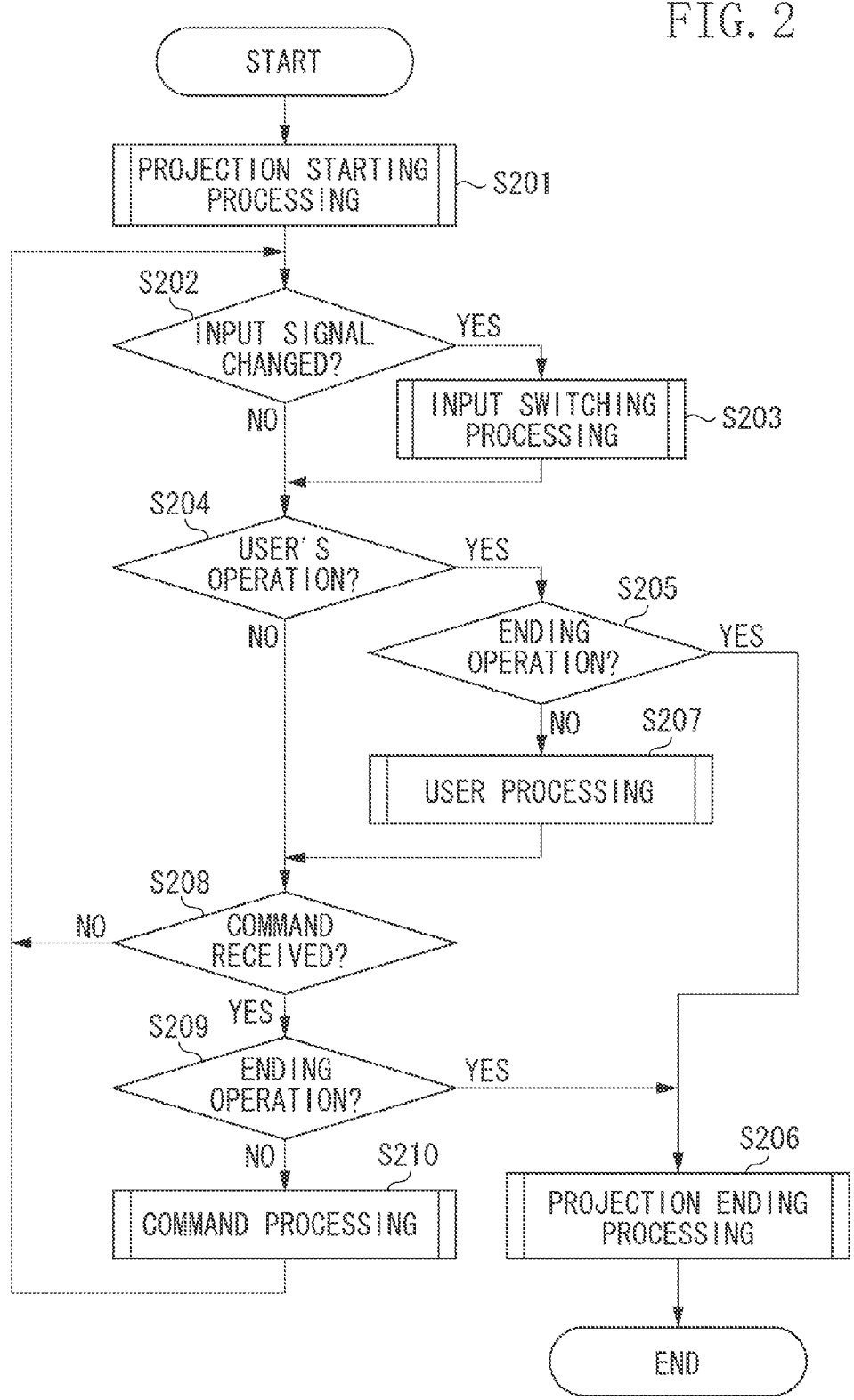
FIG. 2 is a flowchart illustrating an example of an operation of the projector according to the first and second exemplary embodiments.

FIG. 2 is a flowchart illustrating an example of an operation performed by the projector 100. With reference to FIG. 2, an operation of the projector 100 will be described. The operation illustrated in the flowchart of FIG. 2 is executed by the CPU 110 controlling various units of the projector 100 based on programs stored in the ROM 111. At the time point when the user instructs that the power of the projector 100 is turned on by using the operation unit 113 or a remote controller (not illustrated), the flow illustrated in FIG. 2 starts.

When the user, using the operation unit 113 or a remote controller (not illustrated), instructs that the power of the projector 100 is turned on, in step S201, the CPU 110 supplies electric power to various units of the projector 100 from a power supply unit and executes a projection starting processing. The projection starting processing includes, for example, processing to control the light source control unit 160 so as to turn on the light source 161, processing to control the liquid crystal control unit 150 so as to drive the liquid crystal elements 151R, 151G and 151B, processing to set an operation of the image processing unit 140.

In step S202, the CPU 110 determines whether there has been a change in the input signal input from the image input unit 130. If there has not been a change in the input signal (NO in step S202), the CPU 110 proceeds to step S204. If there has been a change in the input signal (YES in step S202), the processing proceeds to step S203. In step S203, the CPU 110 executes input switching processing. For example, the CPU 110 detects the resolution and the frame rate of the input signal or the like, and samples the input image at suitable timings, and performs necessary image processing to project the image.

In step S204, the CPU 110 determines whether the user has performed an operation. If the user has not operated the operation unit 113 or the remote controller (NO in step S204), the processing proceeds to step S208. If the user has operated the operation unit 113 or the remote controller (YES in step S204), the processing proceeds to step S205. In step S205, the CPU 110 determines whether the user's operation is an operation for ending the image projection. If the user's operation is an operation for ending the image projection (YES in step S205), the CPU 110 executes a projection ending processing in step S206, and then ends the flow of operation. The projection ending processing includes, for example, processing to control the light source control unit 160 so as to turn off the light source 161, processing to control the liquid crystal control unit 150 so as to stop driving the liquid crystal elements 151R, 151G and 151B, processing to store necessary settings into the ROM 111.

If the user's operation is not an operation for ending the image projection (NO in step S205), the processing proceeds to step S207. In step S207, the CPU 110 executes user processing that corresponds to the user's operation. The user processing includes, for example, processing for changing the position of a region in which an image is projected, processing for changing the input signal, processing for changing the image processing, processing for displaying information.

In step S208, the CPU 110 determines whether a command has been received from an external apparatus. If a command has not been received from an external apparatus (NO in step S208), the processing returns to step S202. If a command has been received from an external apparatus (YES in step S208), the processing proceeds to step S209. In step S209, the CPU 110 determines whether the command received from the external apparatus is a command for ending the image projection. If the command received from the external apparatus is a command for ending the image projection (YES in step S209), the processing proceeds to step S206. If the command received from the external apparatus is not a command for ending the image projection (NO in step S209), the processing proceeds to step S210. In step S210, the CPU 110 executes command processing that corresponds to the command received from the external apparatus. The command processing includes, for example, processing for setting the position of the region in which images are projected, processing to set the input signal, processing to set the image processing, processing to acquire information about the status of the projector 100.

The projector 100 displays at least one of an image input from the image input unit 130, and still image data or moving image data read out from the recording medium 192 by the recording-reproducing unit 191.

Figure 3:
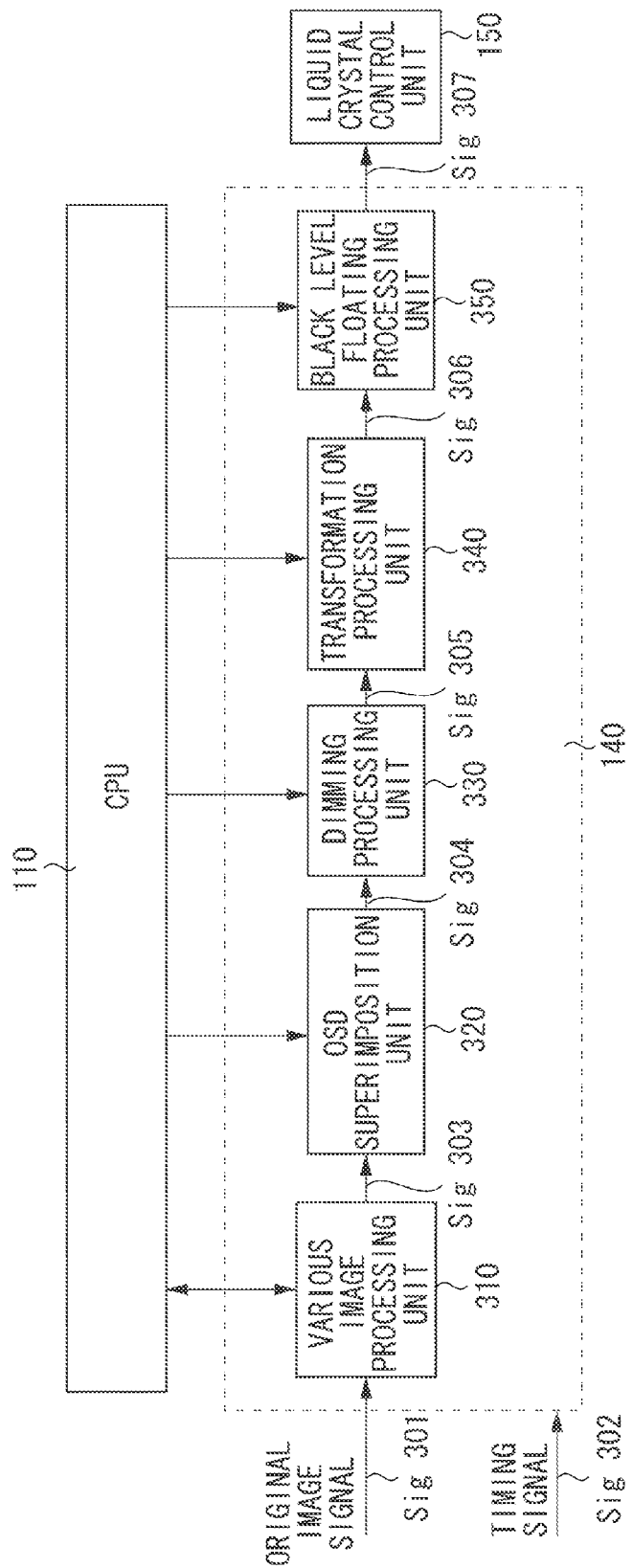
FIG. 3 is a block diagram illustrating an example of a configuration of an image processing unit according to the first and second exemplary embodiments.

FIG. 3 is a block diagram illustrating an example of a configuration of the image processing unit 140. With reference to FIG. 3, the image processing unit 140 will be described. The image processing unit 140 includes an image processing unit 310 for processing various kinds of images, an on-screen display (OSD) superimposition unit 320, a dimming unit 330, a transformation processing unit 340, and a black level fluctuation processing unit 350.

An original image signal sig 301 is a signal that is input to the image processing unit 140 from one of the image input unit 130, the recording-reproducing unit 191, and the communication unit 193. A timing signal sig 302 is a timing signal such as a vertical synchronization signal or a horizontal synchronization signal synchronized with the original image signal sig 301, or a clock, etc., and is supplied from the supply source of the original image signal sig 301 to the image processing unit 140. Each block in the image processing unit 140 operates based on the timing signal sig 302. However, a timing signal may be generated within the image processing unit 140.

The image processing unit 310, cooperating with the CPU 110, acquires statistical information, including a histogram and an average picture level (APL) about the original image signal sig 301, and generates an image signal sig 303 that has been subjected to various kinds of image processing. The various kinds of image processing include an interlace/progressive (IP) conversion, a frame rate conversion, a resolution conversion, a gamma conversion, a color gamut conversion, a color correction, and an edge enhancement. The image processing unit 310 outputs the generated image signal sig 303 to the OSD superimposition unit 320.

The OSD superimposition unit 320 superimposes, on image signal sig 303, guide information for a menu or operation for the user as an OSD image according to an instruction from the CPU 110, and outputs the generated OSD-superimposed image signal sig 304 to the dimming unit 330.

The dimming unit 330, according to the instruction from the CPU 110, performs dimming processing on the superimposed overlap region of the OSD-superimposed image signal sig 304 received from the OSD superimposition unit 320, and outputs the generated image signal sig 305 to the transformation processing unit 340. The dimming processing is a process to apply a gain so that illumination decreases gradually from the boundary with the non-overlap region toward an end portion of the overlap region, in an overlap region that is a region in which the projection image is overlapped with a projection image projected by another projector when a multi-projection is performed. With reference to FIG. 4 and FIGS. 5A to 5D, the dimming processing performed by the dimming unit 330 will be described in detail. In FIG. 4 and FIGS. 5A to 5D, it is assumed that projectors face at right angle to the screen.

Figure 4:
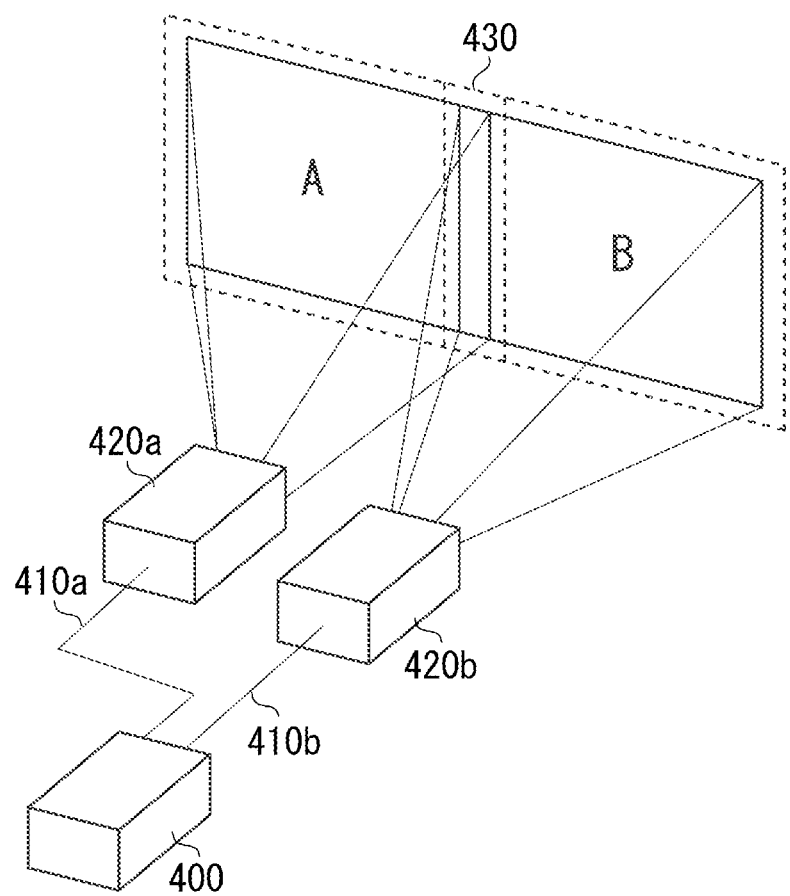
FIG. 4 is a diagram illustrating an example of a configuration of a multi-projection system according to the first and second exemplary embodiments.

FIG. 4 is a perspective view illustrating a multi-projection in the first and second exemplary embodiments. Referring to FIG. 4, an image signal source 400 is connected to a projector 420a via a cable 410a and to a projector 420b via a cable 410b. The image signal source 400 supplies image signals to the projector 420a via the cable 410a, and supplies image signals to the projector 420b via the cable 410b. The projector 420a and the projector 420b are assumed to have a configuration as illustrated in FIG. 1. The projector 420a projects, onto a screen 430, images based on the image signals supplied from the image signal source 400, and the projector 420b projects, onto the screen 430, images based on the image signal supplied from the image signal source 400. An image formed by overlapping a part of an image A projected on the screen 430 by the projector 420a and a part of an image B projected on the screen 430 by the projector 420b is displayed. Such a projection method is termed as a multi-projection.

FIGS. 5A to 5D illustrate an example of a positional relationship between the signal of an image projected onto the screen 430 by the projector 420a, the signal of an image projected onto the screen 430 by the projector 420b, and the signal of an image projected by the multi-projection.

FIG. 5A illustrates a projection image 500a projected by the projector 420a and FIG. 5B illustrates a projection image 500b projected by the projector 420a. The projection image 500a includes a non-overlap region 510a that does not overlap with the projection image 500b and an overlap region 520a that overlaps with a part of the projection image 500b. Furthermore, the projection image 500b includes a non-overlap region 510b that does not overlap with the projection image 500a and an overlap region 520b that overlaps with a part of the projection image 500a.

FIG. 5C illustrates an example of a gain distribution in a horizontal direction of the projection image 500a and the projection image 500b. A gain 530a is applied to the OSD-superimposed image signal sig 304 by the dimming unit 330 of the projector 420a. A gain 530b is applied to the OSD-superimposed image signal sig 304 by the dimming unit 330 of the projector 420b. The gain 530a and the gain 530b in the non-overlap region 510a and the non-overlap region 510b is "1.0". In the overlap region 520a and the overlap region 520b, the gain 530a and the gain 530b are distributed according to the position in the horizontal direction so as to be 1.0 at the boundaries with the non-overlap region 510a and the non-overlap region 510b, and 0 at the projection image ends of the overlap region 520a and the overlap region 520b, respectively. In FIG. 5C, the gain 530a in the overlap region 520a and the gain 530b in the overlap region 520b are changed linearly, but the gains 530a and 530b in the overlap regions 520a and 520b may be changed along S-shaped curves.

FIG. 5D illustrates a combined image formed by the projection image 500a and the projection image 500b. The overlap region 540 is a part where the overlap region 520a and the overlap region 520b are overlapped with each other. The luminance value distribution in the horizontal direction of the overlap region 540 is substantially constant due to the gradients of the gain 530a in the overlap region 520a and the gain 530b in the overlap region 520b. As a result, the gain is substantially equal to the gain 530a in the non-overlap region 510a or the gain 530b in the non-overlap region 510b. Thus, the boundary between the overlap region 540 and the non-overlap region 510a is inconspicuous, and also the boundary between the overlap region 540 and the non-overlap region 510b is inconspicuous.

Figure 17:
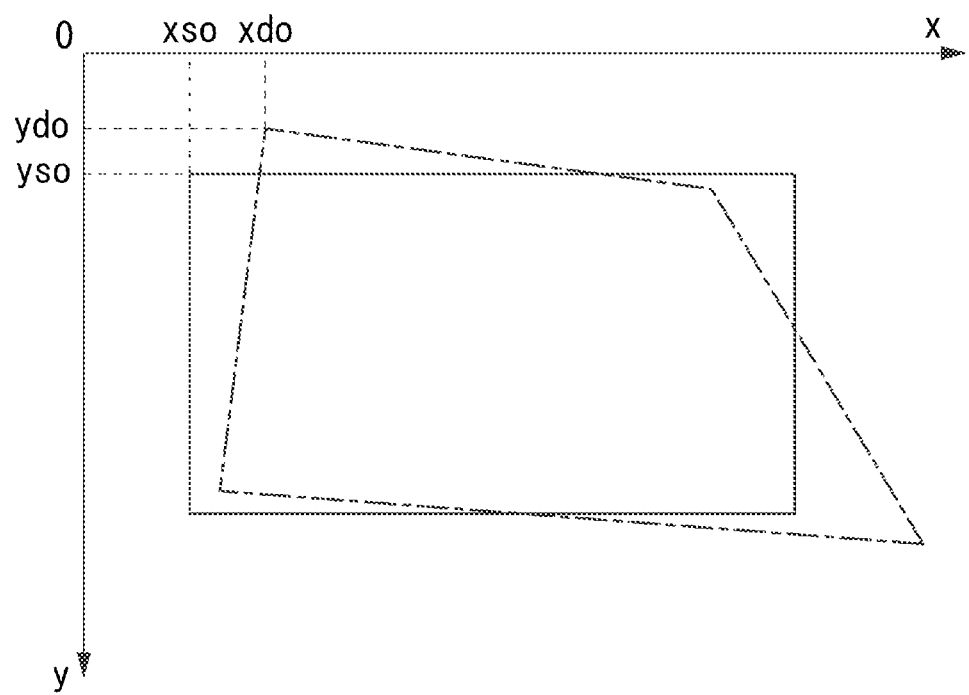
FIG. 17 is a diagram illustrating a projective transform according to the first and second exemplary embodiments.

The transformation processing unit 340 performs a geometrical transformation on the image signal sig 305 based on a transformation formula or transformation parameters set by the CPU 110, and then outputs the post-transformation image signal sig 306. The keystone correction can be realized by the projective transform. The CPU 110 sets one or more parameters for the projective transform in the transformation processing unit 340. Assuming that the coordinates of an original image are (xs, ys) and the coordinates of a post-transformation image are (xd, yd), the following relation is obtained.

$$\begin{pmatrix} xd \\ yd \\ 1 \end{pmatrix} = M \begin{pmatrix} xs - xs0 \\ ys - yso \\ 1 \end{pmatrix} + \begin{pmatrix} xdo \\ ydo \\ 0 \end{pmatrix} \quad (1)$$

where M is a 3×3 projective transform matrix for transform from the original image to the post-transformation image, and is input from the CPU 110. (xso, yso) are the coordinate values of one of the vertices of the original image as illustrated by a solid line in FIG. 17. (xdo, ydo) are the coordinate values of a vertex of the post-transformation image as illustrated by a one-dot chain line in FIG. 17, which corresponds to the vertex (xso, yso) of the original image.

From the CPU 110, an inverse matrix $M^{-1}$ to the matrix M in formula (1) and the offsets (xso, yso) and (xdo, ydo) are input to the transformation processing unit 340. The transformation processing unit 340 determines the coordinates (xs, ys) of the original image corresponding to the post-transformation coordinates (xd, yd), according to formula (2). Specifically, in a case where the coordinates (xs, ys) of the original image determined by formula (2) are integer values, the pixel value on the coordinates (xs, ys) of the original image may be directly used as the pixel value of the coordinates (xd, yd) of the post-transformation image.

$$\begin{pmatrix} xs \\ ys \\ 1 \end{pmatrix} = M^{-1} \begin{pmatrix} xd - xd0 \\ yd - ydo \\ 1 \end{pmatrix} + \begin{pmatrix} xso \\ yso \\ 0 \end{pmatrix} \quad (2)$$

However, the coordinates of the original image determined by formula (2) do not always have integer values. Therefore, interpolation using the value of peripheral pixels is performed to determine the pixel value at the coordinates (xd, yd) of a post-transformation image. As for the method of the interpolation, an arbitrary interpolation method, such as bilinear interpolation or bicubic interpolation, may be used. Furthermore, if the coordinates of the original image determined based on formula (2) are outside the original image region, the transformation processing unit 340 sets the pixel value at the coordinates to black or a background color set by the user.

In this way, the transformation processing unit 340 determines pixel values for all the coordinates (or all the pixels) of a post-transform image to create the post-transformation image.

As described above, the CPU 110 inputs the matrix M and its inverse matrix $M^{-1}$ to the transformation processing unit 340, but the CPU 110 may input the inverse matrix $M^{-1}$ to the transformation processing unit 340, and the transformation processing unit 340 may internally generate the matrix M. Furthermore, the CPU 110 may input the matrix M to the transformation processing unit 340, and the transformation processing unit 340 may internally generate the inverse matrix $M^{-1}$.

The post-transformation image signal sig 306 output by the transformation processing unit 340 is supplied to the black level fluctuation processing unit 350. In projectors, even at the time of black display, a light leakage may cause a black level fluctuation. The amount of black level fluctuation in an overlap region is the sum total of the amounts of black level fluctuation in the projection images superposed in the overlap region. As a result, generally, the black level displayed in an overlap region is displayed brighter than the black level displayed in a non-overlap region. The black level fluctuation processing unit 350 adjusts the black level of the post-transformation image signal sig 306 with respect to the non-overlap region so that the black level in the non-overlap region is substantially equal to the black level in the overlap region, and then outputs a post-black level fluctuation correction image signal sig 307.

The post-black level fluctuation correction image signal sig 307 is supplied to the liquid crystal control unit 150, and is displayed in the liquid crystal elements 151R, 151G, and 151B.

When the multi-projection is performed in the first and second exemplary embodiments, it is necessary to set one of the projector 420a and the projector 420b as a main projector. FIG. 6 is an example of a flowchart illustrating a setting process for setting one of the projector 420a and the projector 420b as a main projector. It is assumed that the setting process illustrated in FIG. 6 is performed by each of the projector 420a and the projector 420b. Hereinafter, a case where the projector 420a executes the setting process illustrated in FIG. 6 will be described.

Figure 7A:
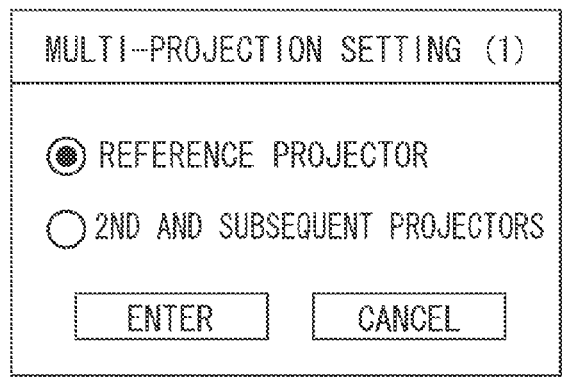
FIGS. 7A to 7D illustrate examples of display of a menu according to the first and second exemplary embodiments.

The CPU 110 of the projector 420a controls the OSD superimposition unit 320 so as to display a multiple installation menu as illustrated in FIG. 7A on the display unit 196. The user sets one of the projector 420a and the projector 420b as a reference projector (main projector) by using a multiple setting menu displayed on the display unit 196. A case where the user has set the projector 420a as a reference projector will be described below. Due to this setting, the projector 420a is set as a main projector and the projector 420b is set as a sub projector (slave projector). As illustrated in FIG. 6, the CPU 110 of the projector 420a selected as a reference projector performs installation setting for the first projector in step S601 and step S602, and the CPU 110 of the projector 420b performs the installation setting for the second projector in step S601 and step S603. The setting process illustrated in FIG. 6 is executed in substantially the same manner in the case where the projector 420b has been selected as a reference projector.

Figure 8:
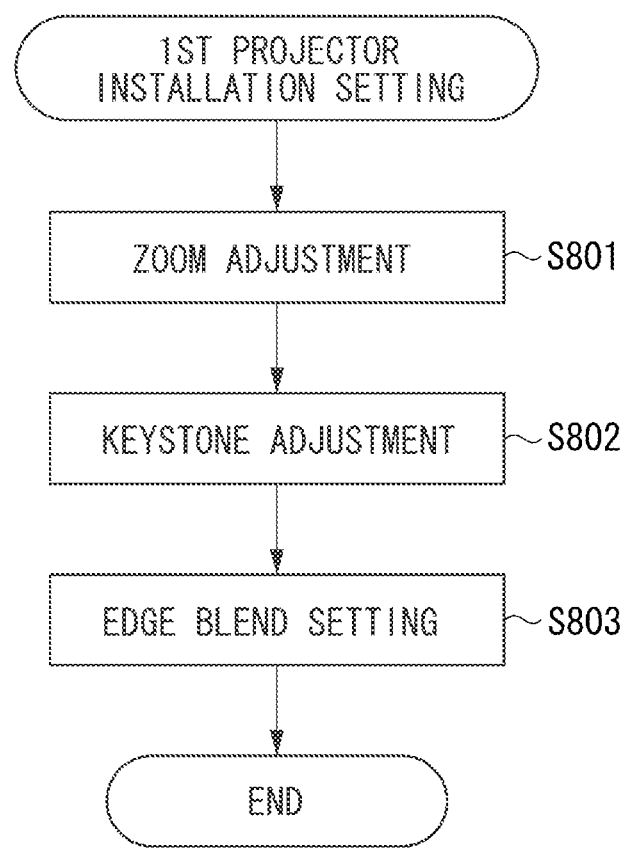
FIG. 8 is a flowchart illustrating an example of setting for a first projector according to the first and second exemplary embodiments.

FIG. 8 is an operation flowchart illustrating an example of the installation setting performed in step S602 of FIG. 6 for the first projector.

Figure 7B:
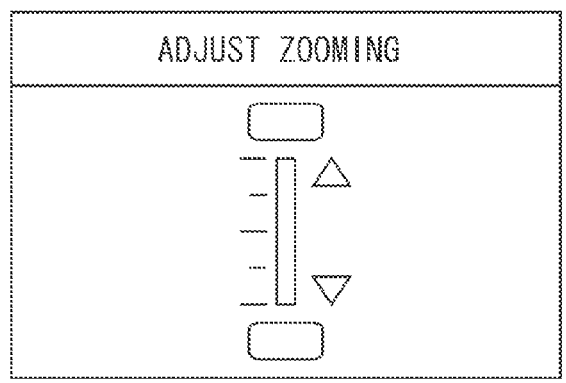

In step S801, the CPU 110 of the projector 420a controls the OSD superimposition unit 320 so as to display a zoom adjustment menu as illustrated in FIG. 7B on the display unit 196, and thereby prompts the user to adjust zooming.

Figure 9A:
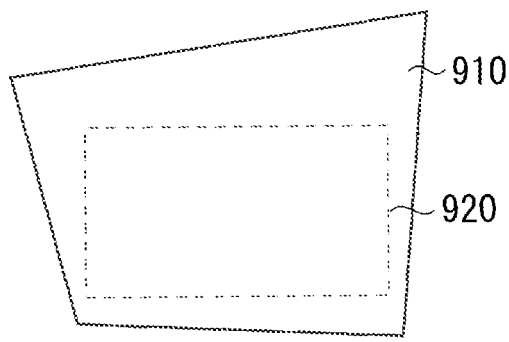
FIGS. 9A to 9D are diagrams illustrating transformation of a projection image by the first projector according to the first and second exemplary embodiments.
Figure 9B:
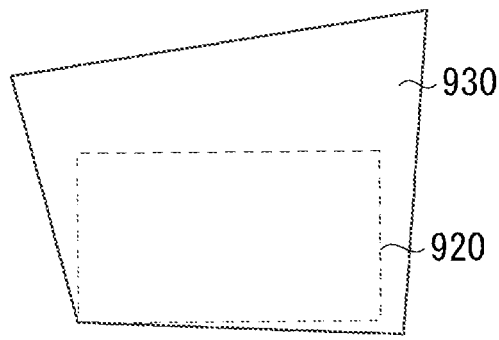

FIGS. 9A to 9D are diagrams illustrating projection regions formed on the screen by the projector 420a. FIG. 9A illustrates a pre-correction projection image 910 and a desired projection region 920 is indicated by a broken line. The user adjusts the zooming of the projector 420a by using the operation unit 113 or a remote controller (not illustrated) so that, as illustrated in FIG. 9B, a post-zoom adjustment projection image 930 embraces the projection region 920 and one of the vertices of the projection image 930 coincides with one of the vertices of the projection region 920. At that time, the user may move the projector 420*a* if necessary.

Figure 7C:
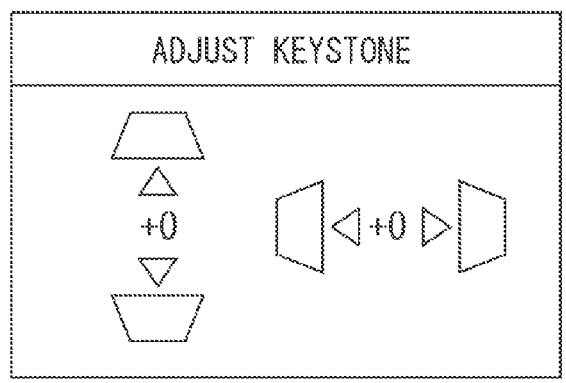

In step S802, the CPU 110 controls the OSD superimposition unit 320 so as to display a vertical/horizontal keystone adjustment menu as illustrated in FIG. 7C on the display unit 196, and thereby prompts the user to carry out keystone adjustment. In the vertical/horizontal keystone adjustment, a relative tilt angle between the screen and the projector is given as a setting value via a graphic user interface (GUI), and the CPU 110 calculates post-correction coordinates based on the setting value of the relative tilt angle and sets the calculated coordinates in the transformation processing unit 340, so that the projection image is accordingly transformed.

Figure 9C:
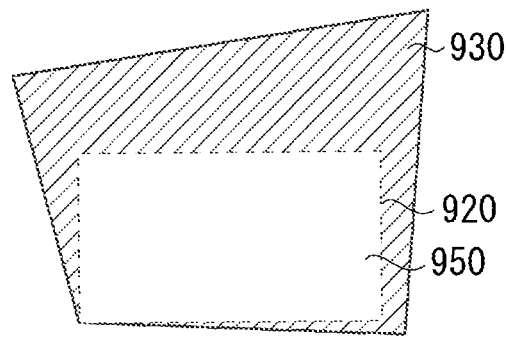

The keystone correction (trapezoidal correction) according to the first and second exemplary embodiments is performed so that one of the vertices of the projection image region remains unmoved. In the example illustrated in FIG. 9B, the lower left vertex 940 remains unmoved. As a result, when the projection image region is adjusted into a rectangular shape by the vertical/horizontal keystone correction, the post-keystone correction projection image 950 coincides with the desired projection region 920 as illustrated in FIG. 9C. In a region outside the post-keystone correction projection image 950, a black image is displayed. A keystone correction algorithm different from this algorithm may be used. In this case, the projection image region can be altered by the zoom adjustment in step S801 of FIG. 8.

Figure 7D:
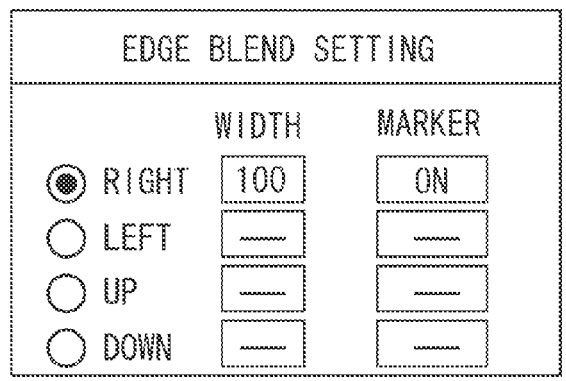

In step S803, the CPU 110 controls the OSD superimposition unit 320 so as to display an edge blend setting menu as illustrated in FIG. 7D on the display unit 196, and thereby prompts the user to perform edge blend setting. The edge blend region is an overlap region. In the case where the projector 420*a* is set as a reference projector, a right-side overlap region is made effective and the width of the overlap region is set. The width of the overlap region is the width of the overlap region in terms of the image signal supplied from the image signal source 400 to the projector 420*a*.

Figure 9D:
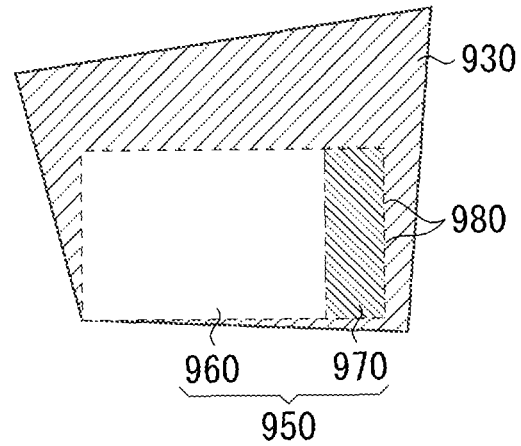

As a guide for position alignment of the projector 420*b*, which is the second projector, the projector 420*a* displays a marker 980 that indicates the overlap region in the projection image. FIG. 9D is an example of a projection image after the edge blend setting. In FIG. 9D, a post-keystone correction non-overlap region 960 and a post-keystone correction overlap region 970 are illustrated. On a side of the overlap region 970, the marker 980 is displayed in a manner, for example, a color, so that the user can visually recognize the marker 980. For example, the marker 980 on the boundary between the non-overlap region 960 and the overlap region 970 is displayed as a black one-dot chain line, and the marker 980 on a frame end is displayed as, for example, a white one-dot chain line.

After the installation setting of the reference projector 420*a* is completed, similar installation setting to that in step S603 is executed on the projector 420*b*, which is the second projector.

FIG. 10 is an operation flowchart illustrating an example of the installation setting in step S603 for the second projector.

In step S1001, the CPU 110 of the projector 420*b* controls the OSD superimposition unit 320 so as to display a zoom adjustment menu as illustrated in FIG. 7B on the display unit 196, and thereby prompts the user to adjust the zooming.

Figure 11A:
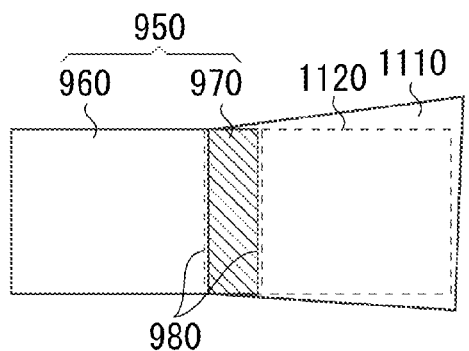
FIGS. 11A to 11F are diagrams illustrating transformation of projection images by subsequent projectors after the second projector according to the first and second exemplary embodiments.
Figure 11B:
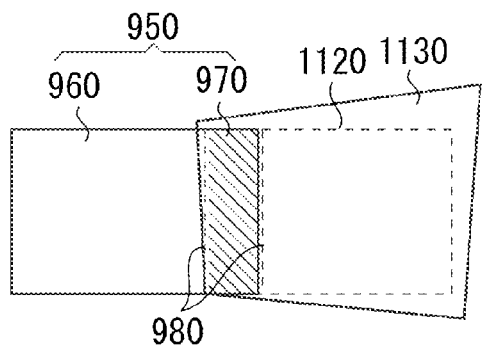

FIGS. 11A to 11F are diagrams illustrating projection regions projected on a screen by the projector 420*b*. The projection image 950 in FIGS. 11A to 11F is a projection image projected by the projector 420*a*. In FIG. 11A, a pre-correction projection image 1110 projected by the projector 420*b* is illustrated. A region 1120 indicated by a broken line is a projection region (target projection region) that is a target where the projection image is to be disposed. The user adjusts the zooming amount of the projector 420*b* by using the operation unit 113 or a remote controller (not illustrated) so that, as illustrated in FIG. 11B, a post-zoom adjustment projection image 1130 embraces the projection region 1120 and one of the vertices of the projection image 1130 coincides with one of the vertices of the projection region 1120. At that time, the user may move the projector 420*b* if necessary.

Figure 11C:
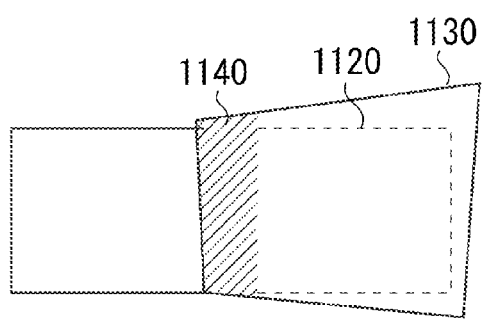

In step S1002, the CPU 110 controls the OSD superimposition unit 320 so as to display the edge blend setting menu as illustrated in FIG. 7D on the display unit 196, and thereby prompts the user to perform edge blend setting. In a case where the projector 420*b* is set as a sub projector, a left-side overlap region is made effective and the width of the overlap region is set. The width of the overlap region is the width of the overlap region in terms of the image signal supplied from the image signal source 400 to the projector 420*b*. Thus, a projection image by the projector 420*b* is projected so as to project an overlap region 1140 in a dimmed state as illustrated in FIG. 11C.

Figure 12A:
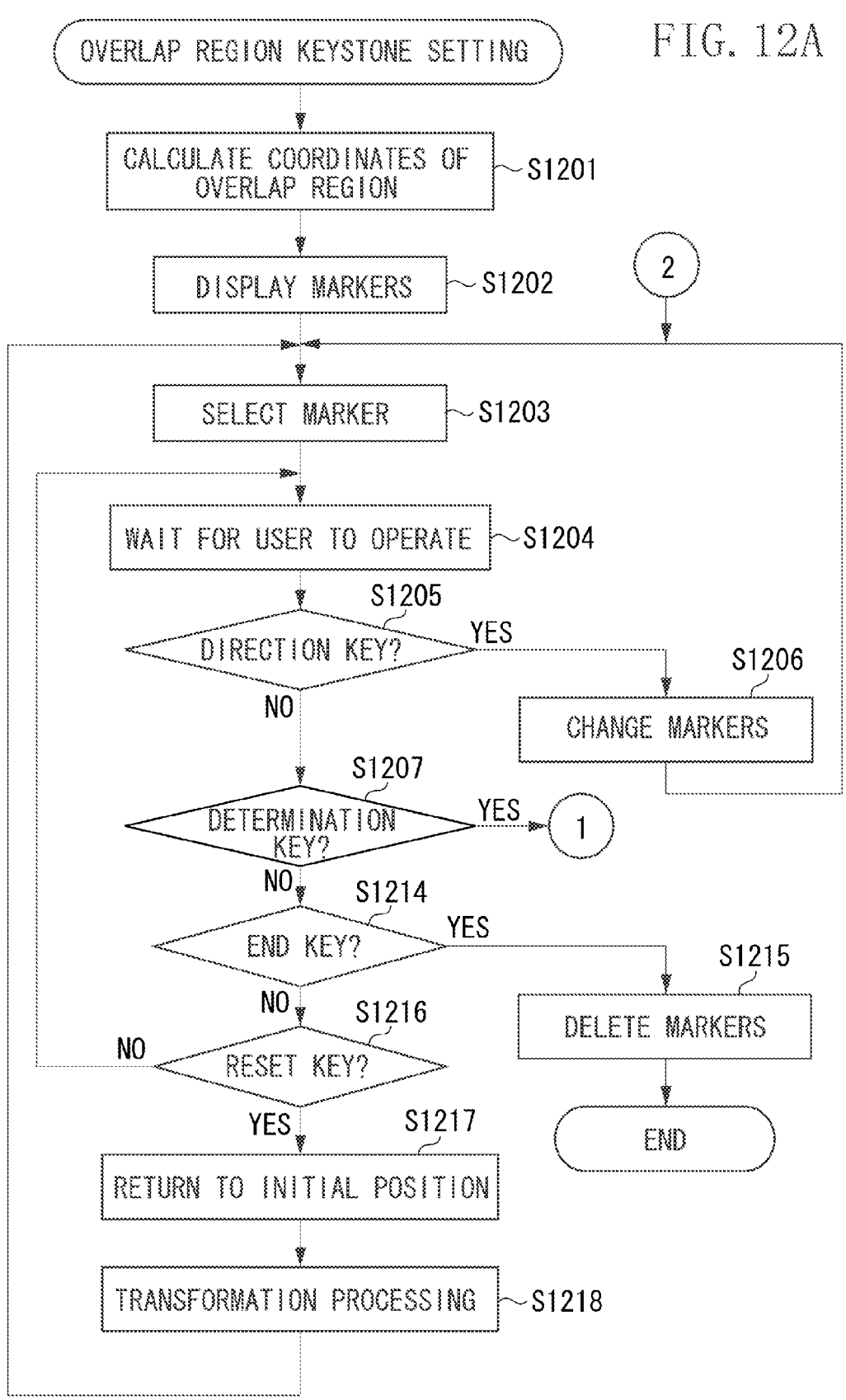
FIGS. 12A and 12B are a flowchart illustrating an example of adjustment processing according to the first and second exemplary embodiments.
Figure 12B:
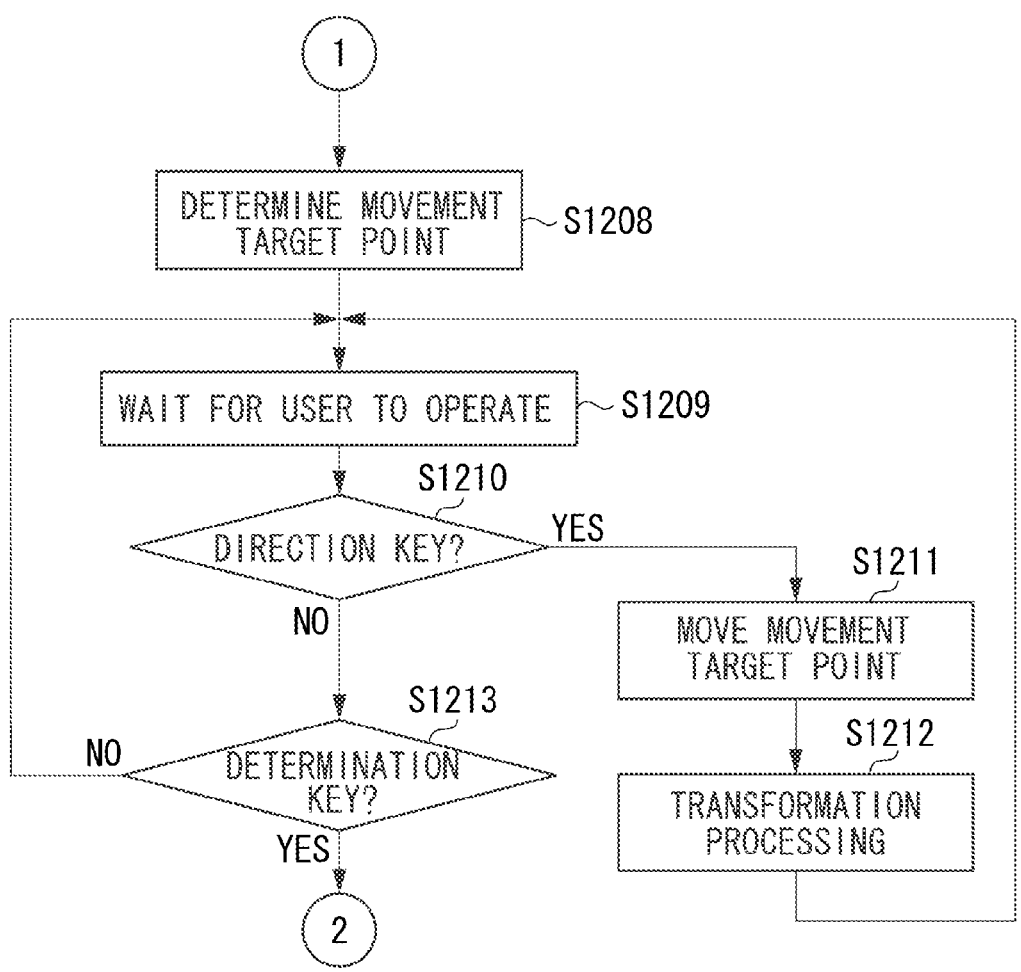

In step S1003, the CPU 110 of the projector 420*b* performs adjustment processing for adjusting the keystone in an overlapped region. FIG. 12A and FIG. 12B are a detailed flowchart of the adjustment processing of step S1003 for adjusting the keystone in the overlapped region.

In step S1201, the CPU 110 calculates coordinate values about the overlap regions on the liquid crystal elements 151R, 151G, and 151B from the width information and side information about the overlap regions set in step S1002.

Figure 11D:
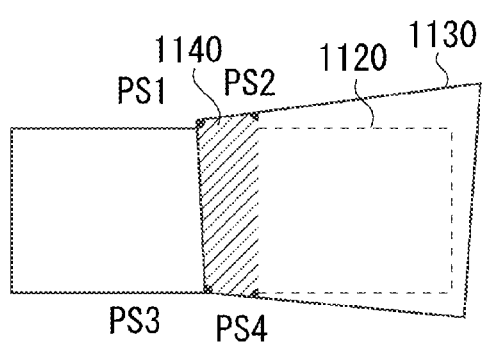

In step S1202, the CPU 110 controls the OSD superimposition unit 320 so as to display transformation markers on the four corners of the overlap region, on the display unit 196. As a result, as illustrated in FIG. 11D, transformation markers PS1 to PS4 are displayed on the four corners of the overlap region 1140. The transformation markers PS1 to PS4 are disposed at positions that correspond to the four corners of the overlap region 520*a* in the example illustrated in FIGS. 5A to 5D. In the processing described below, the transformation markers PS1 to PS4 are individually adjusted.

In step S1203, the CPU 110 selects one of the transformation markers PS1 to PS4 as a candidate object to move. The user selects, from the transformation markers PS1 to PS4, a transformation marker that becomes a candidate for the object to move, by using a direction key in the operation unit 113 or the like. In step S1204, the CPU 110 waits for the user to perform an operation such as an operation on a remote control key or a main-body switch. Upon acceptance of an operation performed by the user, the CPU 110 determines in step S1205 whether the key operated by the user was any one of the direction keys (up, down, left, and right keys). If the operated key is a direction key (YES in step S1205), the processing proceeds to step S1206. In step S1206, the CPU 110 changes the transformation marker selected in step S1203 to the transformation marker of the designated direction according to the pressed direction key, and then the processing returns to step S1203.

For example, if the right key is pressed when the transformation marker PS1 has been selected in step S1203, the CPU 110 selects the transformation marker PS2 as a candidate for the object to move. If the Down key is pressed when the transformation marker PS1 has been selected in step S1203, the CPU 110 selects the transformation marker PS3 as a candidate for the object to move. Meanwhile, if the up key or the left key is pressed when the transformation marker PS1 has been selected in step S1203, the CPU 110 does not change the candidate for the object to move from the transformation marker PS1 to another transformation marker.

If the key operated by the user is not a direction key (NO in step S1205), the processing proceeds to step S1207. In step S1207, the CPU 110 determines whether the key operated by the user is the determination key. If the key operated by the user is the determination key (YES in step S1207), the processing proceeds to step S1208. In step S120, the CPU 110 determines that the transformation marker currently selected as a candidate for the object to move is the object to move (as the movement-target point). At that time, the CPU 110 controls the OSD superimposition unit 320 so as to display an operation guide for the movement operation, on the display unit 196.

In step S1209, the CPU 110 waits for an operation to be performed by the user, in order to move the transformation marker (movement-target point) determined in step S1208. Upon accepting an operation performed by the user, in step S1210, the CPU 110 determines whether the key operated is one of the direction keys (up, down, left, and right keys). If the key operated by the user is a direction key (YES in step S1210), the processing proceeds to step S1211. In step S1211, the CPU 110 moves the transformation marker determined in step S1208 according to the pressed direction key, then in step S1212, executes a transformation process according to the movement operation, and then the processing returns to step S1209.

In step S1210, if it is determined that the operated key is not a direction key (NO in step S1210), the processing proceeds to step S1213. In step S1213, the CPU 110 determines whether the operated key is the determination key. If the operated key is not the determination key (NO in step S1213), it means that the operated key is an invalid key, and therefore the processing returns to step S1209. In step S1209, the CPU waits for the next operation by the user. If the operated key is the determination key (YES in step S1213), it means that the movement operation for the transformation marker (movement-target point) determined in step S1208 has ended, and therefore the CPU 110 returns to step S1203. In step S1203, the CPU 110 performs a processing for selecting a candidate for the next target to move.

In step S1207, if it is determined that the operated key is not the determination key (NO in step S1207), the processing proceeds to step S1214. In step S1214, the CPU 110 determines whether the key operated by the user is an end key. If the key operated by the user is the end key (YES in step S1214), the processing proceeds to step S1215. In step S1215, the CPU 110 deletes the display of the transformation markers PS1 to PS4, and then ends the overlapped region keystone correction processing.

If the key operated by the user is not the end key (NO in step S1214), the processing proceeds to step S1216. In step S1216, the CPU 110 determines whether the key operated by the user is a reset key. If the operated key is not the reset key (NO in step S1216), it means that the operated key is an invalid key, and therefore the processing returns to step S1204. In step S1204, the CPU 110 waits again for an operation to be performed by the user. If the key operated by the user is the reset key (YES in step S1216), the processing proceeds to step S1217. In step S1217, the CPU 110 returns the transformation markers PS1 to PS4 to the initial positions. In step S1218, the CPU 110 carries out the transformation processing, and then the processing returns to step S1203. The transformation processing is similar to that in step S1212.

Figure 13:
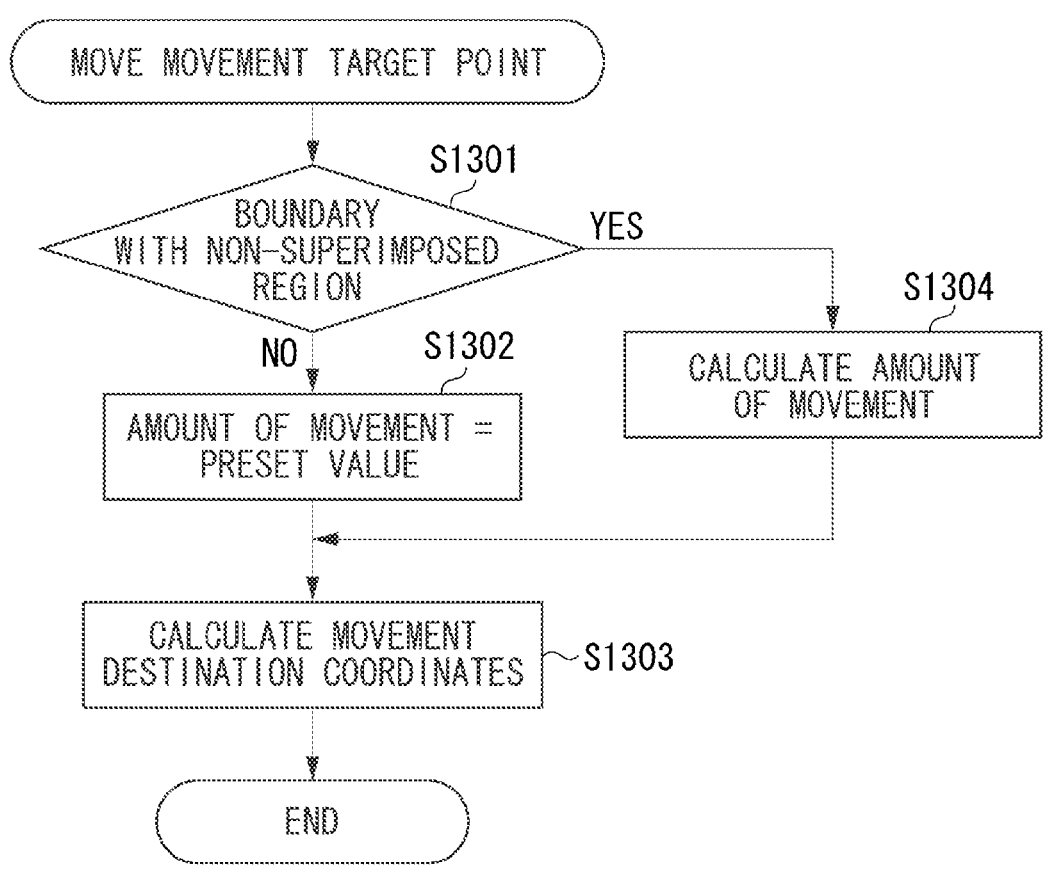
FIG. 13 is a flowchart illustrating movement-target point movement processing according to the first and second exemplary embodiments.

FIG. 13 is a flowchart illustrating an example of the movement-target point movement performed in step S1211. In step S1301, the CPU 110 determines whether the transformation marker (movement-target point) among the transformation markers PS1 to PS4 determined in step S1208 is on the boundary between the non-overlap region and the overlap region of the target projection region 1120. In FIGS. 5A to 5D, the projector 420a, which is the first projector, includes the non-overlap region 510a, while the projector 420b, which is the second projector, includes the non-overlap region 510b. In the example illustrated in FIG. 11D, the transformation markers PS1 and PS3 are not on the boundary between the overlap region and the non-overlap region of the projector 420b, which is the second projector. On the other hand, the transformation markers PS2 and PS4 are on the boundary between the overlap region and the non-overlap region.

If it is determined that the transformation marker (movement-target point) determined in step S1208 is not on the boundary between the overlap region and the non-overlap region (NO in step S1301), the processing proceeds to step S1302. In step S1302, the CPU 110 sets the amount of movement to a preset value d. Then, in step S1303, the CPU 110 calculates the coordinates of a destination of the movement from the coordinates of the currently selected transformation marker (movement-target point) by the amount of movement d determined in step 1302 in the direction of the direction key determined in step S1210. In a case where the transformation marker PS1 is determined as the object to move in the example illustrated in FIG. 11D, the CPU 110 moves the transformation marker PS1 to the right if the right key is pressed, and moves the transformation marker PS1 down if the down key is pressed. However, since moving the transformation marker PS1 outside the display region of the liquid crystal element is impossible, pressing the up key or the left key will not move the transformation marker PS1 any further if the transformation marker PS1 lies at such an end of the display region of the liquid crystal element.

Figure 14A:
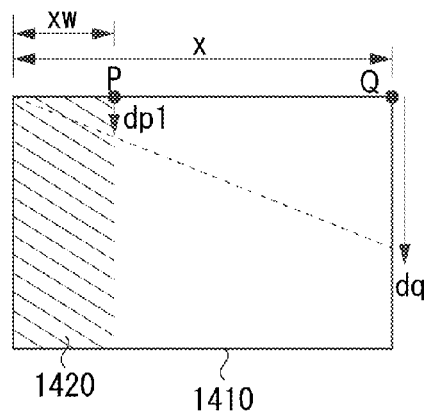
FIGS. 14A to 14D are diagrams illustrating a calculation of an amount of movement according to the first exemplary embodiment.

In step S1304, if the transformation marker (movement-target point) determined in step S1208 lies on the boundary between the overlap region and the non-overlap region of the host projector (YES in step S1301), the processing proceeds to step S1304. In step S1304, the CPU 110 calculates the amount of movement. The calculation method for the amount of movement will be described with reference to FIGS. 14A to 14D. FIG. 14A is an example of a case where edge blending is performed in the right and left directions. In FIG. 14A, a region 1410 is an effective region where an image is displayed on each of the liquid crystal elements 151R, 151G and 151B. An overlap region 1420 lies on the left side in FIG. 14. The width of the overlap region 1420 is denoted by xw, and the resolution (a size expressed in the same unit as the width xw) in the horizontal direction of the effective region 1410 is denoted by x. The amount of movement dp1 by which a movement-target point P on the boundary between the overlap region 1420 and a non-overlap region (a region other than the overlap region 1420 in the effective region 1410) is to be moved down can be calculated by using the preset value d set in step 1302 as follows:

$$dp1 = d \times xw/x \quad (3)$$

Incidentally, the movement-target point P is a point that corresponds to the transformation marker determined in step S1208.

Figure 14C:
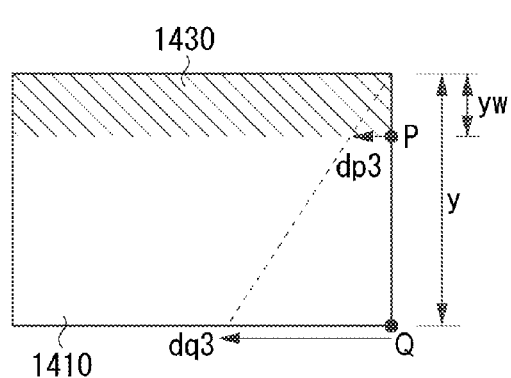
Figure 14B:
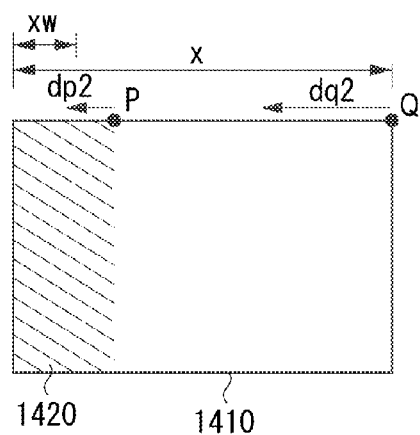

FIG. 14B is an example of a case where, in the edge blending in the right and left directions, the movement-target point P on the boundary between the overlap region 1420 and the non-overlap region (the region other than the overlap region 1420 in the effective region 1410) is to be moved leftward. In this case, the amount of movement dp2 can be determined as follows.

$$dp2 = d \times xw/x \quad (4)$$

The amounts of movement dq1 and dq2 of a vertex Q of the effective region 1410 caused by the movement of a vertex P of the overlap region present on the boundary between the overlap region and the non-overlap region are substantially equal to the amounts of movement d of a transformation marker (movement-target point) that is not on the boundary with the non-overlap region.

FIG. 14C is an example of a case where edge blending is performed in the up and down directions. In the example illustrated in FIG. 14C, an overlap region 1430 lies at an upper-side position in a projection image. The width of the overlap region is denoted by yw and the resolution (a size expressed in the same unit as the width yw) in the vertical direction of the effective region of a liquid crystal element is denoted by y. The amount of movement dp3 by which the movement-target point P on the boundary between the overlap region 1430 and a non-overlap region (a region other than the overlap region 1420 in the effective region 1410) is to be moved leftward can be calculated by using the preset value d set in step S1302 as follows:

$$dp3 = d \times yw/y \quad (5)$$

Figure 14D:
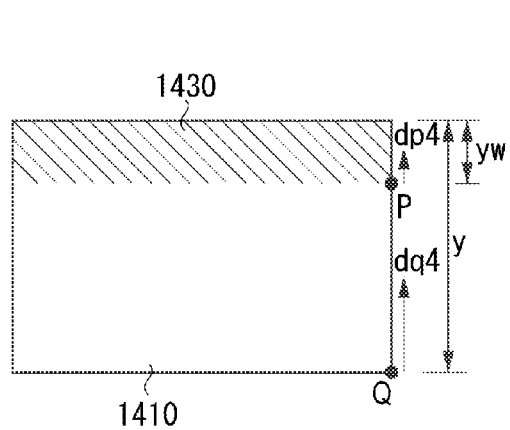

FIG. 14D is an example of a case where, in the edge blending in the up and down directions, a movement-target point P on the boundary between the overlap region 1420 and the non-overlap region (the region other than the overlap region 1420 in the effective region 1410) is to be moved upward. In this case, too, the amount of movement dp4 can be determined as follows.

$$dp4 = d \times yw/y \quad (6)$$

The amounts of movement dq3 and dq4 of the vertex Q of the effective region 1410 caused by the movement of the vertex P present on the boundary between the overlap region and the non-overlap region are approximately equal to the amounts of movement d of a transformation marker (movement-target point) that is not on the boundary with the non-overlap region.

The CPU 110, each time a direction key is pressed carries out a transformation processing by setting a quadrangle whose vertices are four corrected points including the movement-target point as the post-transformation image region, and then stores the coordinates of the post-transformation quadrangle into the RAM 112 (step S1212). The user presses the right key and the down key several times while watching edge blend markers 980 displaced by the projector 420*a* (i.e., first projector), so that the movement-target point coincides with the upper left corner of the overlap region 970 of the projection image projected by the projector 420*a*.

Figure 11E:
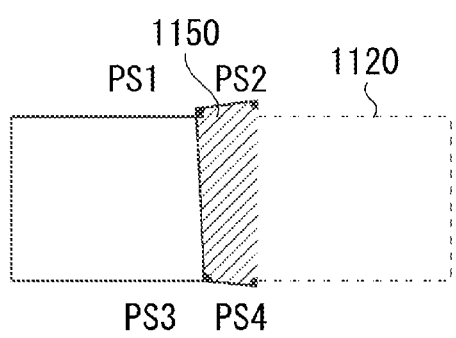

A state in which the movement of the transformation marker PS1 has been completed is illustrated in FIG. 11E. A transformation marker PS1 is displayed at the post-movement position.

Each time the transformation marker is moved in step S1211, the CPU 110 executes a transformation by the transformation processing unit 340 according to the post-movement coordinates of the transformation marker (step S1212). The transformation processing can be realized by determining an projective transform matrix M and an offset that change a quadrangle 1140 that is the pre-correction overlap region into a post-transformation overlap region 1150 and setting the projective transform matrix and the offset in the transformation processing unit 340.

Figure 11F:
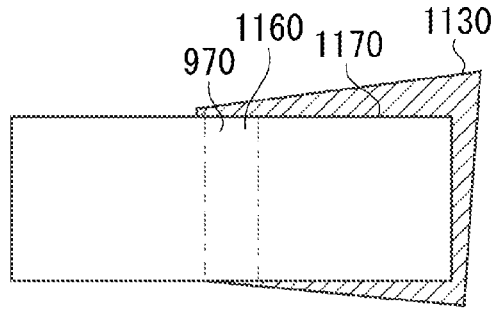

In this manner, the transformation markers PS1 to PS4 of the overlap region 1140 of the projection image projected by the projector 420*b* can be coincident with the four corners of the post-keystone correction overlap region 970 of the projection image projected by the projector 420*a*. FIG. 11F illustrates this state of coincidence. In FIG. 11F, the post-movement transformation markers PS1 to PS4 are coincident with the four corners of the post-keystone correction overlap region 970 of the projection image projected by the projector 420*a*. As a result, the post-correction overlap region 1160 of the projection image projected by the projector 420*b* can be coincident with the post-keystone correction overlap region 970 of the projection image produced by the projector 420*a*. Furthermore, since the transformation processing unit 340 performs, on the post-correction projection image 1170 projected by the projector 420*b*, substantially the same transformation process as on the overlap region projected by the projector 420*b*, the projection image 1170 is automatically corrected into a rectangle about which the aspect ratio is preserved.

In the first exemplary embodiment, in a case where the four-point correction is performed using the four corners of an overlap region as movement-target points for transformation, when a movement-target point is present on the boundary with the non-overlap region of the host projector, the amount of movement is calculated according to the width of the overlap region, and the resolution of the effective region. In this way, a good adjustment precision can be realized regardless of the width of an overlap region.

In the first exemplary embodiment, in step S1304, the CPU 110 calculates the amount of movement in the case where the transformation marker (movement-target point) determined in step S1208 is on the boundary between the overlap region and the non-overlap region of the host projector, according to the preset value d, the width of the overlap region, and the resolution of the effective region by using formula (3) to formula (6). However, instead of the calculation method of the amount of movement as that in the first exemplary embodiment, a calculation method of the amount of movement illustrated below in a second exemplary embodiment may also be employed.

Figure 15:
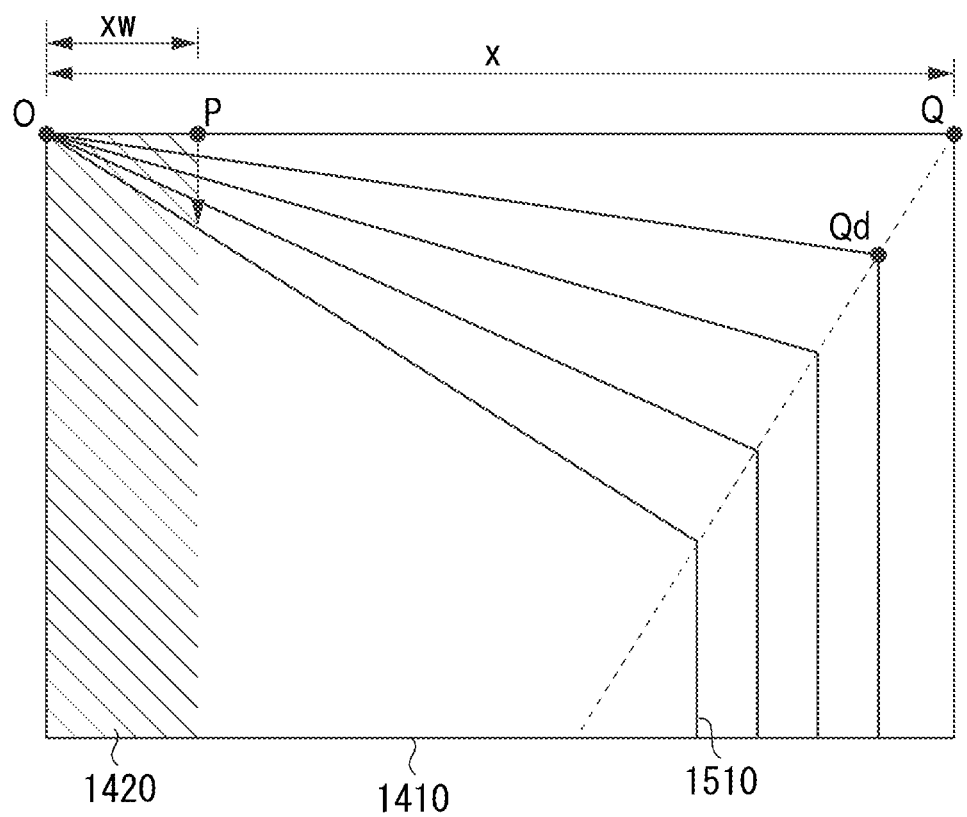
FIG. 15 is a diagram illustrating a calculation of an amount of movement according to the second exemplary embodiment.
Figure 16:
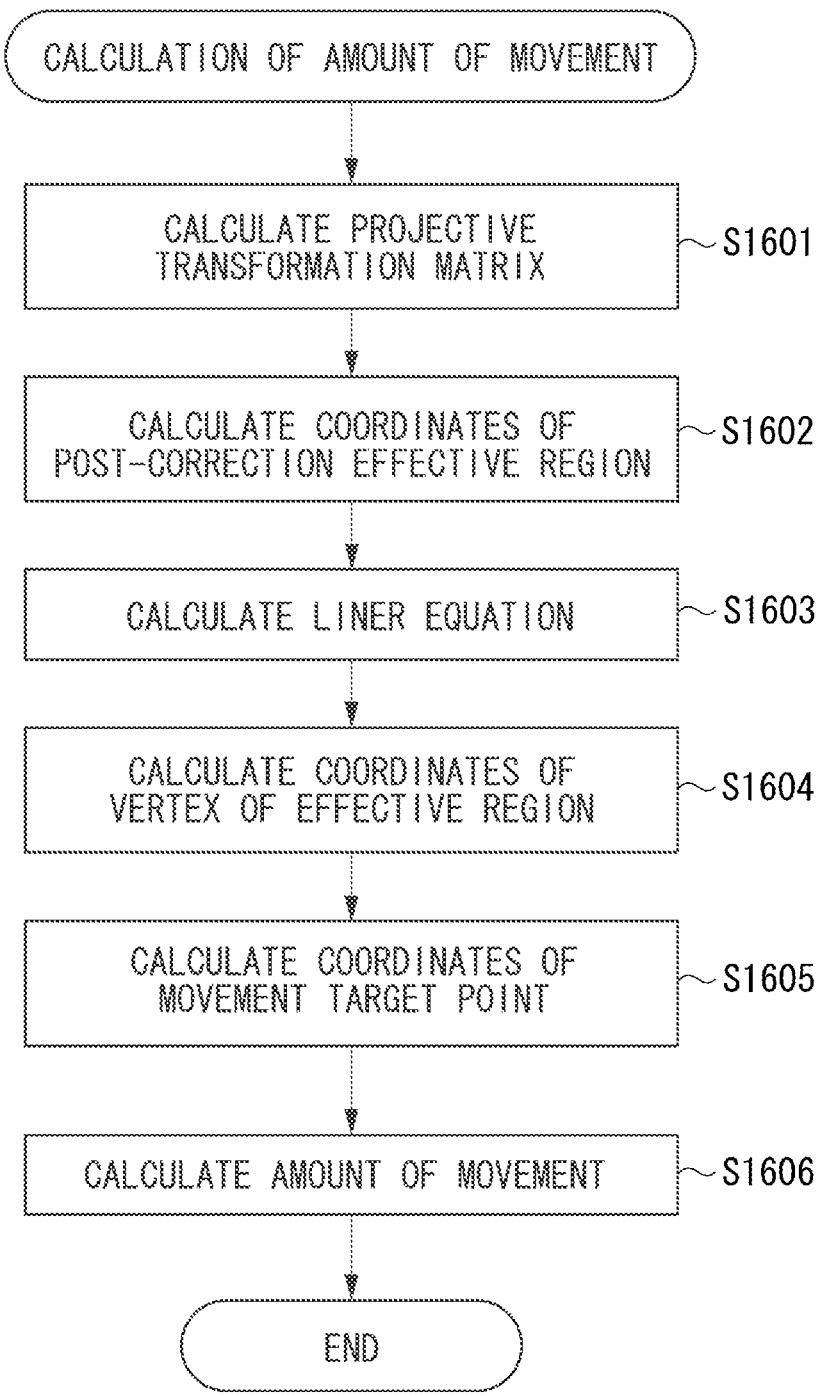
FIG. 16 is a flowchart illustrating an example of calculation processing for calculating an amount of movement according to the second exemplary embodiment.

FIG. 15 is a diagram illustrating the calculation method of the amount of movement according to the second exemplary embodiment. FIG. 16 is a flowchart illustrating the calculation (step S1304) of the amount of movement according to the second exemplary embodiment. When the transformation marker (movement-target point) determined in step S1208 is moved, the vertex Q of the effective region 1410 moves on a straight line according to the amount of movement of the transformation marker (movement-target point). The vertex Q of the effective region 1410 is in the non-overlap region and adjacent to a transformation marker (movement-target point).

In step S1601, the CPU 110 determines a projective transform matrix from the coordinates of the quadrangles of an overlap region obtained prior and subsequent to the correction (movement) performed in a case where the transformation marker (movement-target point) determined in step S1208 (FIG. 12B) is greatly moved in the direction of the direction key operated in step S1209. In FIG. 15, a point P is the aforementioned movement-target point. The point P corresponds to a transformation marker.

In step S1602, the CPU 110 determines the post-correction coordinates of the effective region 1510 obtained when the projective transform matrix determined in step S1601 is applied to the effective region 1410. The point indicated by the post-correction coordinates of the effective region 1510 is the vertex Q in FIG. 15.

In step S1603, the CPU 110 determines an equation of a straight line that connects the pre-correction coordinates and the post-correction coordinates of the vertex (point Q in FIG. 15) of the effective region 1410. When the movement-target point P is moved in the same direction, the vertex Q moves on this straight line (indicated by a broken line in FIG. 15).

In step S1604, the CPU 110 determines coordinates of the point reached by moving the vertex Q by the preset value d on the straight line determined in step S1603 (point $Q_d$ in FIG. 15).

In step S1605, the CPU 110 determines the coordinates of the intersection point between a straight line connecting the vertex $Q_d$ determined in step S1604 and the vertex (point O in FIG. 15) of the overlap region which is at the opposite side of the movement-target point P to the vertex Q and a straight line extending from the movement-target point P in the movement direction, and determines the coordinates of the intersection point as the post-movement coordinates of the movement-target point P.

Finally, in step S1606, the CPU 110 determines the amount of movement from the pre and post-movement coordinates of the movement-target point P.

According to the present exemplary embodiment, the amount of movement of a vertex of the effective region 1410, which is in the non-overlap region and adjacent to a movement-target point, can be caused to match the amount of movement caused in the case where the movement-target point is not on the boundary between the overlap region and the non-overlap region. Therefore, the precision in adjustment can be constant.

Herein, the amount of movement is determined so that the amount of movement of the vertex Q on the straight line is the preset value d. However, it is also possible to determine the amount of movement so that the amount of movement in a vertical or horizontal direction is the preset value d.

Furthermore, in a case where the movement-target point is on the boundary between the overlap region and the non-overlap region of the host projector, the CPU 110 may employ the coordinates of the movement-target point determined in step S1605 as results of the calculation in step S1303, instead of performing the process of step S1606.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-195366, filed Sep. 25, 2014, which is hereby incorporated by reference herein in its entirety.

What is claimed is:

1. A display apparatus that operates to configure an image projection system configured to project an image by combining on a screen a plurality of projection images projected by a plurality of display apparatuses so that the images partially overlap each other, the display apparatus comprising:
   a transformation unit configured to perform a geometrical transformation on a projection image; and
   a setting unit configured to set a parameter of the geometrical transformation by the transformation unit based on a relation between a position of an overlap region in a projection image obtained before the geometrical transformation by the transformation unit is performed, and a position of the overlap region in the projection image obtained after the geometrical transformation is performed,
   wherein an amount or value of the geometrical transformation is changed according to a position of a vertex of the overlap region.

2. The display apparatus according to claim 1, wherein, of four vertices of the overlap region, a vertex on a boundary with a non-overlap region of the projection image is transformed in the amount or value of the geometrical transformation smaller than the amount or value of the geometrical transformation of a vertex that is not on the boundary with the non-overlap region.

3. The display apparatus according to claim 1, further comprising:
   a light modulation unit configured to perform light modulation on a post-transformation image output from the transformation unit; and
   a projection unit configured to form the projection image by projecting an image generated by the light modulation unit,
   wherein, of four vertices of the overlap region, a vertex on a boundary with a non-overlap region of the projection image is transformed in the amount or value of the geometrical transformation which is determined based on a preset value determined beforehand, a width of the overlap region, and a resolution of an effective region of the light modulation unit.

4. The display apparatus according to claim 3, wherein the vertex, of the four vertices of the overlap region, that is not on the boundary with the non-overlap region is transformed by using the preset value as the amount or value of the geometrical transformation.

5. The display apparatus according to claim 3,
wherein the setting unit is capable of selecting a first mode in which the parameter of the geometrical transformation is set based on the relation between the position of the overlap region in the projection image before the geometrical transformation is performed, and the position of the overlap region in the projection image after the geometrical transformation is performed, or a second mode in which the parameter of the geometrical transformation is set based on a shape of the effective region of the light modulation unit before the geometrical transformation and the shape of the effective region after the geometrical transformation, and
wherein the preset value is the amount or value of the geometrical transformation in the second mode.

6. The display apparatus according to claim 1, wherein the amount or value of the geometrical transformation is changed based on a ratio of a width of the projection image to a width of the overlap region.

7. A control method for a display apparatus that operates to configure an image projection system configured to project an image by combining on a screen a plurality of projection images projected by a plurality of display apparatuses so that the images partially overlap each other, the control method comprising:
performing a geometrical transformation on a projection image;
setting a parameter of the geometrical transformation based on a relation between a position of an overlap region in a projection image obtained before the geometrical transformation is performed and a position of the overlap region in the projection image obtained after the geometrical transformation is performed; and
changing an amount or value of the geometrical transformation according to a position of a vertex of the overlap region.

8. The control method according to claim 7, wherein the amount or value of the geometrical transformation is changed based on a ratio of a width of the projection image to a width of the overlap region.

9. A projector that operates to configure an image projection system configured to combine on a screen a plurality of projection images projected by a plurality of projectors so that the images partially overlap each other, the projector comprising:
a transformation unit configured to perform a geometrical transformation on an image to be projected, according to a movement operation on a vertex of an overlap region of the image; and
a projection unit configured to project the image transformed by the transformation unit,
wherein the transformation unit changes an amount of movement of the vertex of the overlap region in the image so that a position of a vertex of the image to be projected corresponding to the vertex of the overlap region that is to be a target of the movement operation is moved by a predetermined amount of movement in a predetermined unit, amount or value.

10. The projector according to claim 9, wherein the amount or value of the geometrical transformation is changed based on a ratio of a width of the image to be projected to a width of the overlap region.

11. A control method for a projector that operates to configure an image projection system that combines on a screen a plurality of projection images projected by a plurality of projectors so that the images partially overlap each other, the control method comprising:
performing a geometrical transformation on an image to be projected, according to a movement operation on a vertex of an overlap region of the image; and
projecting the transformed image,
wherein an amount of movement of the vertex of the overlap region in the image is changed so that a position of a vertex of the image to be projected corresponding to the vertex of the overlap region that is to be a target of the movement operation is moved by an amount of movement in a predetermined unit, amount, or value.

12. The control method according to claim 11, wherein the amount or value of the geometrical transformation is changed based on a ratio of a width of the image to be projected to a width of the overlap region.

* * * * *